United States Patent

[11] 3,619,533

[72] Inventor George L. McFarland
Salem, Va.
[21] Appl. No. 37,581
[22] Filed May 15, 1970
[45] Patented Nov. 9, 1971
[73] Assignee General Electric Company

[54] CONTACTOR WITH TIP WEAR INDICATOR
4 Claims, 3 Drawing Figs.
[52] U.S. Cl...................................................... 200/167 R,
200/166 BD
[51] Int. Cl.......................................................... H01h 9/16
[50] Field of Search........................................... 200/167 R,
166 M, 165 R, 166 BD

[56] References Cited
UNITED STATES PATENTS
2,981,817   4/1961   Frentzel ...................... 200/166 M X Primary Examiner—H. O. Jones
Attorneys—Arnold E. Renner, Frank L. Neuhauser, Joseph B. Forman and Oscar B. Waddell ABSTRACT: A contactor, with a contact tip wear indicator for visually denoting the status of contact tips, includes a calibrated member coacting with a movable contact assembly to project externally from the contactor a distance proportional to the distance traveled by the movable contact to engage stationary contacts.

CONTACTOR WITH TIP WEAR INDICATOR

BACKGROUND OF THE INVENTION

For electrical contactors, periodic inspection of the contact tips is necessary to determine whether or not they are worn to a point which might cause the contactor to malfunction. To expose the contact tips for inspection, it is often necessary to remove covers, arc chutes, frameworks springs, contact supports, etc., all of which must be reassembled after the inspection.

The time required to perform such an inspection is wasted if the contact tips are found to be in good condition. If, on the other hand, the contact tips wear excessively prior to inspection, they may weld together resulting in damage to the controlled motor or other controlled device. It would be desirable, therefore, to be able to determine the wear of the contact tips at any time without having to disassemble and reassemble a major portion of the contactor.

Accordingly, an object of the present invention is to provide a contactor incorporating therein a novel indicator for accurately indicating the amount of contact tip wear.

Another object of the invention is to provide a simple indicator mechanism wherein major functional parts are provided as an integral part of the contactor.

SUMMARY OF THE INVENTION

The present invention permits the desirable determination indicated above by providing a contactor embodying a device for indicating the amount of contact tip wear. More specifically, the invention is directed to a contactor which includes an extensible indicator whereby the amount of contact tips remaining is indicated when the contactor is energized.

BRIEF DESCRIPTION OF THE DRAWINGS

For a more complete understanding of the present invention, reference is made to the accompanying drawings in which.

DETAILED DESCRIPTION

Figure 1:
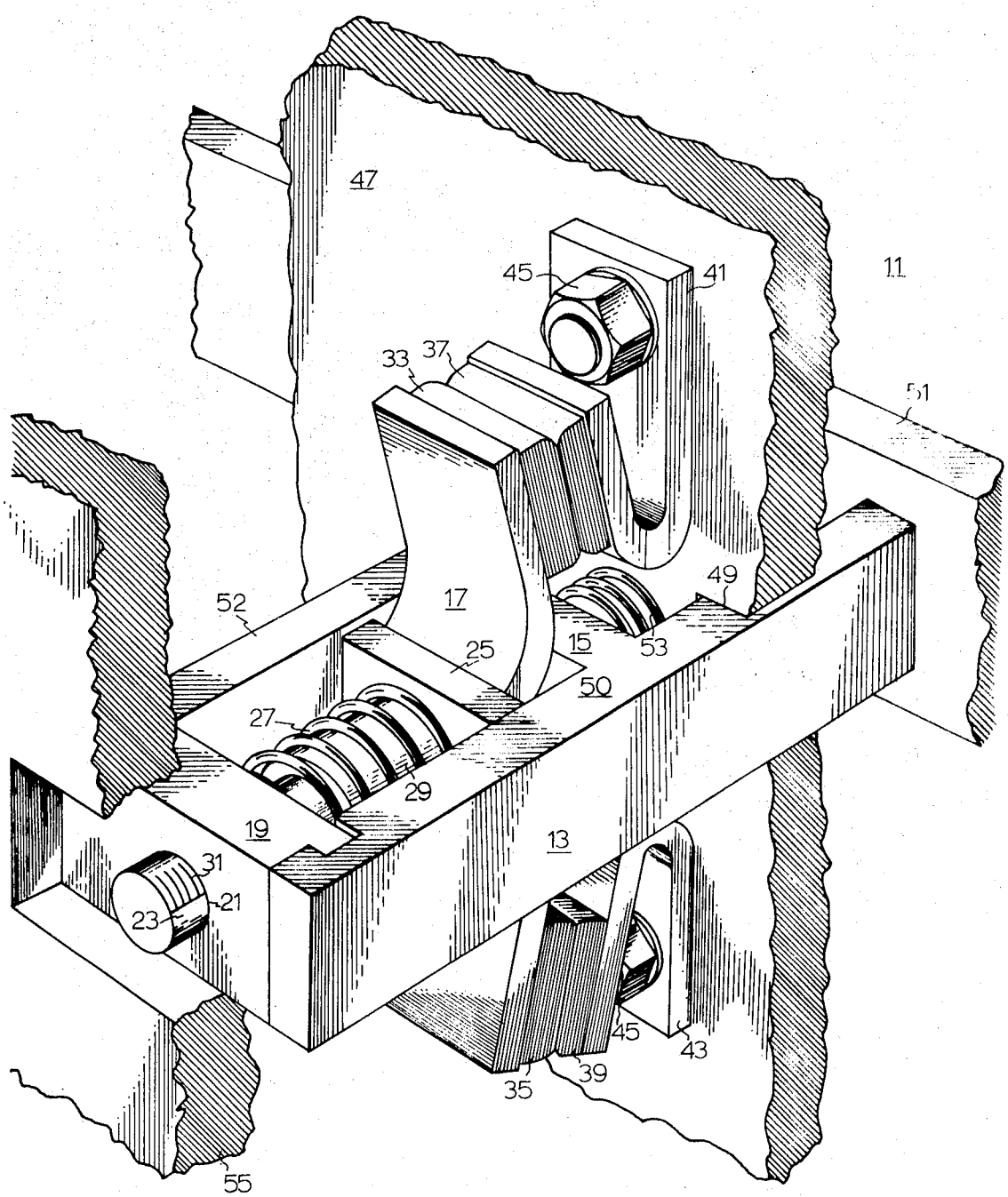
FIG. 1 is a perspective view, partly broken away, showing a contactor having a tip wear indicator in accordance with the present invention.

With reference now to FIG. 1, there is shown a single-pole electrical contactor assembly 11 having a movable frame 13 including a side 15 which is shaped to fit a curved surface 16 (see FIGS. 2 and 3) of a movable contact assembly 17. A pressure plate 19 forms the opposite side of the frame 13, the pressure plate 19 being retained by shaped ends of adjacent frame sides 50 and 52. The pressure plate 19 is removable for the purpose of changing the movable contact assembly 17. A hole 21 in the pressure plate 19 provides guidance for an indicator 23 with which it is slidingly associated. The indicator 23 has a rectangular shoulder 25 that is urged against the movable contact assembly 17 by a spring 27 which is compressed between the shoulder 25 and the pressure plate 19. A central portion 29 of the indicator 23 has an enlarged diameter to fit the inside diameter of the spring 27, thereby providing support thereto. The indicator 23 is also provided with a series of graduation marks 31 which provide an indication of the condition of the contactor contact tips as will be described in detail later.

Stationary contacts 41 and 43, which may be assembled to a contactor base 47 by suitable means such as bolts and nuts 45, comprise a first contacting element. Contact tips 37 and 39 are mounted, respectively, on the stationary contacts 41 and 43. The movable contact assembly 17, upon which two contact tips 33 and 35 are mounted for cooperating, respectively, with contact tips 37 and 39, comprises a second contacting element. Rectangular opening 49 provides passage for an extension of the frame side 50; and an identical opening, obscured in FIG. 1 by the movable contact assembly, provides passage for an extension of the frame side 52, both extensions being connected to actuating means such as a bar 51 which in turn is attached to a suitable prime mover, e.g., an armature of a solenoid, which closes and opens the contactor. With the contactor closed, the bar 51 is positioned as shown in FIG. 1. During closing of the contactor, the frame 13 and the movable contact assembly 17 move with the bar 51 until the contact tips 33, 37 and 35, 39 touch, at which time the movable contact assembly 17 is held while the frame 13 and the bar 51 continue to move to the limit of the prime mover, such movement being commonly known as overtravel. During overtravel spring 27 is compressed causing increased pressure between contact tips 33, 37 and 35, 39 respectively.

Touching of contacts 33, 37 and 35, 39 and the consequent halting of the movable contact assembly 17 will cause the indicator 23, of which shoulder 25 is an integral part, to project through the hole 21 by a predetermined amount, indicated by graduation marks 31, as the frame 13 is moved to the limit of the prime mover.

A spring 53 compressed between the side 15 and the base 47 aids in returning the frame 13 when the contactor is opened. The operation of opening the contactor is opposite to that of closing in that opening the contactor allows springs 27 and 53 to expand. Frame 13 moves until the side 15 touches the movable contact assembly 17. At this point, the movable contact assembly 17 moves with the frame 13 allowing the pairs of contact tips 33, 37 and 35, 39, respectively, to separate, thereby opening the contactor and discontinuing conduction. A front panel 55 may be used to prevent access to the current-carrying components of the contactor and may be used to form a guide for frame 13. Arc chutes (not shown) generally cover the area of the contact tip in order to contain arcing within their immediate area.

Figure 2:
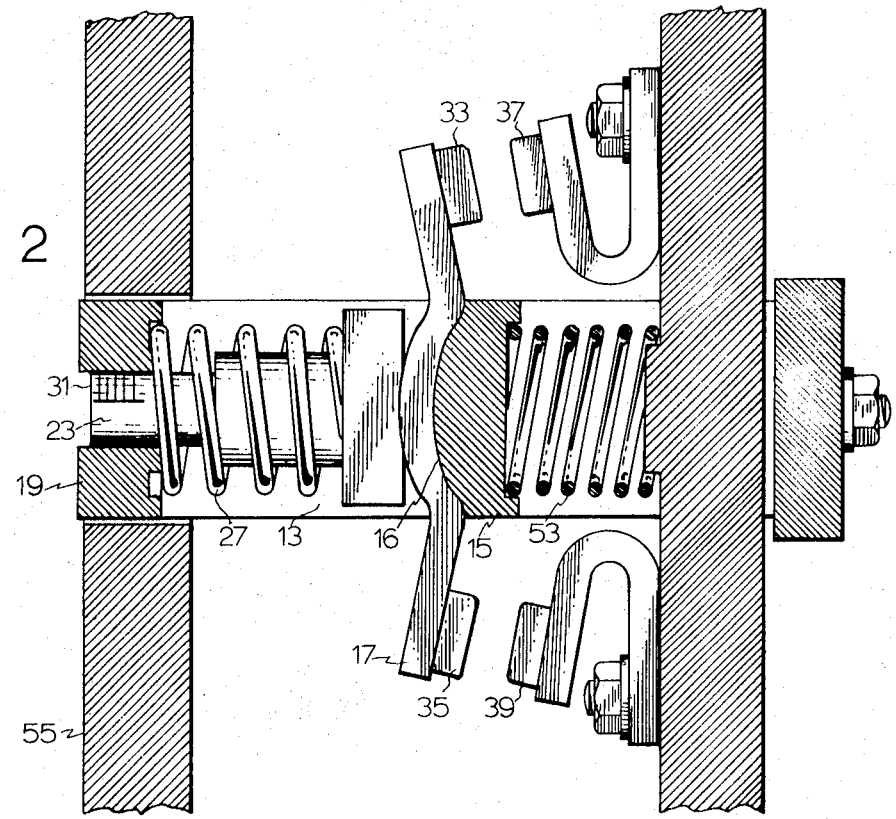
FIG. 2 shows the contactor deenergized, and with new contacts.

FIG. 2 shows a view with the contactor opened, and shows pairs of contact tips 33, 37 and 35, 39 disengaged. The indicator 23 is shown in a retracted position relative to the pressure plate 19 as it would be when the contactor is open. Shaped surfaces of the side 15 and the shoulder 25 provide a seat for the movable contact assembly 17, the side 15 being urged against the movable contact assembly 17 by the spring 53, and the shoulder 25 being urged opposingly against the movable contact assembly 17 by the spring 27.

During closing of the contactor by the prime mover, the frame 13 travels a predetermined distance, determined by the travel of the prime mover, and the movable contact assembly 17 travels a distance determined by the amount of wear of contacts 33, 37 and 35, 39 to establish a definite relationship between the indicator 23 and the pressure plate 19 when the contactor is closed.

Assume now that with new contact tips the relationship is such that the external face of the pressure plate 19 is alignment with the fifth graduate mark of the indicator 23 when the contactor is closed. See FIG. 1.

Figure 3:
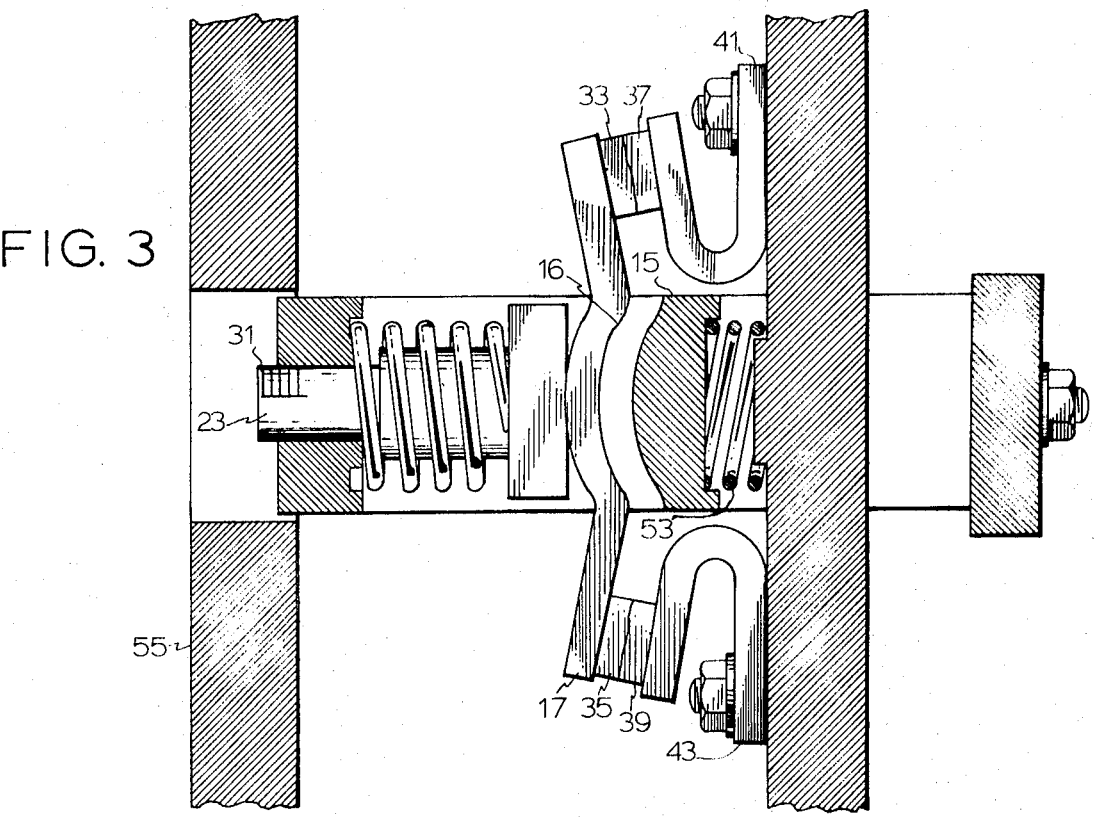
FIG. 3 shows the contactor energized, and with worn contacts.

In FIG. 3, wherein the contactor is shown with contacts worn, the movable contact assembly 17 travels farther while the distance traveled by the frame 13 remains constant as determined by the movement of the prime mover. Spring 53 is compressed by the side 15 which moves the full distance of the prime mover travel, while the movable contact assembly 17 is stopped by the stationary contacts 41 and 43. However, since the pairs of contact tips 33, 37 and 35, 39 are thinner, the point at which the movable contact assembly 17 is stopped is more distant than with unworn tips. Thus, the relative relationship of the indicator 23 position and the pressure plate 19 is changed. The external face of the pressure plate 19 now is aligned with the third graduate mark 31. The indicator thus becomes a means for visual observation of the condition of the contactor contact tips. The graduations 31 may be spaced at a predetermined dimensional distance so that one, knowing the entire thickness of the contact tip, could determine the extent of wear of the contact tips 33, 35, 37, 39 from the number of graduations 31 showing on the indicator 23.

The position of the external surface of the pressure plate 19 may be used as a means of showing the state (closed or open) of the contactor with reference to front panel 55 as shown in FIGS. 2 and 3. The bar 51 which is normally attached to the prime mover may be common with several other contact assemblies, thus forming a multipole contactor as required, each of which has means for showing the condition of its contact tips.

What is claimed is:

1. A contactor including means to indicate contact tip wear comprising: a base; a first contacting element supported by said base; a second contacting element capable of movement into an abutting relationship with said first contacting element; means effecting motion of said second contacting element; and indicator means denoting the amount of wear of said elements; said means effecting motion permitting overtravel with respect to said indicator means to provide an indication of the amount of wear of said contacting elements.

2. A contactor according to claim 1 with the further provision that said indicator means is external to the assembly and is visible without disassembly of said contactor.

3. A contactor including means to indicate contact tip wear comprising: a base; a stationary contact supported by said base; a movable contact assembly capable of movement into an abutting relationship with said stationary contact; means effecting motion of said movable contact assembly; and indicator means denoting the amount of wear of said contacts; said means effecting motion permitting overtravel with respect to said indicator means to provide an indication of the amount of wear of said contacts.

4. A contactor including a contact tip wear indicator comprising: an actuating means; an apertured base; at least one stationary and one movable contact; an indicator abutting said movable contact; and a frame having members extending through the apertures in said base to said actuating means, said frame providing guidance to said movable contact and to said indicator while effecting motion and permitting overtravel with respect to said indicator to provide an indication of the amount of contact tip wear.

* * * * *